March 24, 1970  R. FRIED ET AL  3,502,957
ANTI-SHORTING CIRCUIT FOR LOAD-GUIDED INVERTERS
Filed March 20, 1967  4 Sheets-Sheet 1

INVENTORS
RICHARD FRIED
RUDOLF AUSFELD
BY
Morgan, Finnegan, Durham & Pine
ATTORNEYS March 24, 1970 R. FRIED ET AL 3,502,957
ANTI-SHORTING CIRCUIT FOR LOAD-GUIDED INVERTERS
Filed March 20, 1967 4 Sheets-Sheet 2
Fig. 3
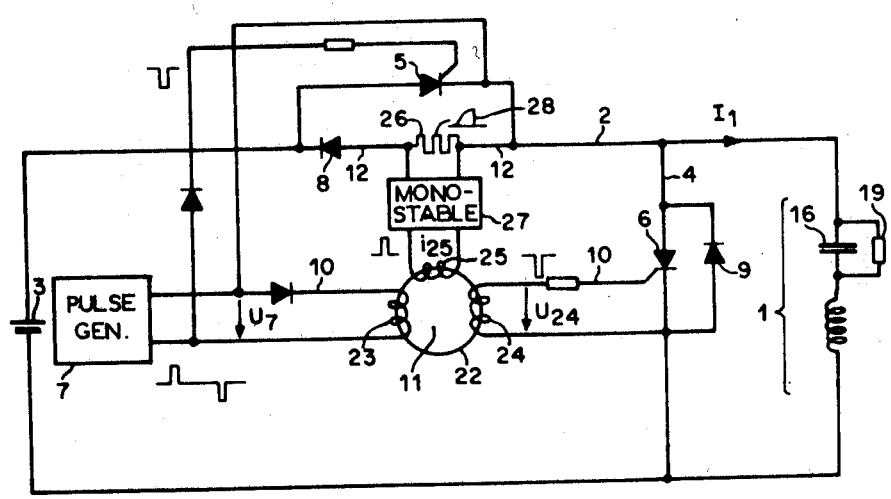
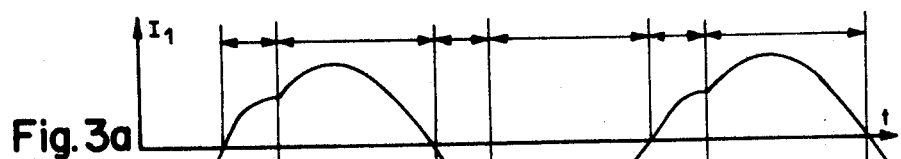
Fig. 3a
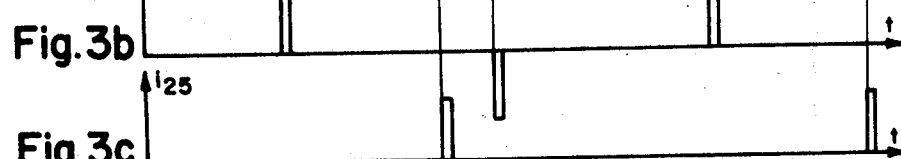
Fig. 3b
Fig. 3c
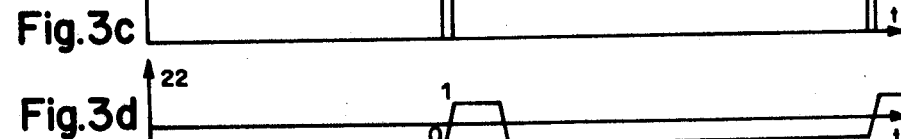
Fig. 3d
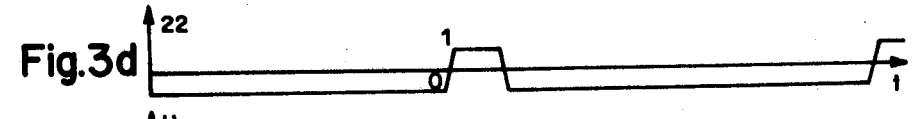
Fig. 3e
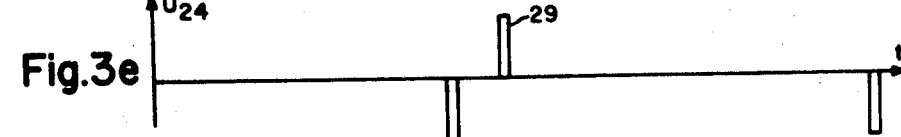
INVENTORS
RICHARD FRIED
RUDOLF AUSFELD
BY
Morgan, Finnegan, Durham & Pine
ATTORNEYS March 24, 1970 R. FRIED ET AL 3,502,957
ANTI-SHORTING CIRCUIT FOR LOAD-GUIDED INVERTERS
Filed March 20, 1967 4 Sheets-Sheet 3

INVENTORS
RICHARD FRIED
RUDOLF AUSFELD
BY
Morgan, Finnegan, Durham & Pine
ATTORNEYS

United States Patent Office
3,502,957
Patented Mar. 24, 1970

3,502,957
ANTI-SHORTING CIRCUIT FOR LOAD-GUIDED INVERTERS
Richard Fried, Fadenstrasse 35, Zug, Switzerland, and Rudolf Arthur Ausfeld, Santisstrasse 3, Pfaffenhausen, Zurich, Switzerland
Filed Mar. 20, 1967, Ser. No. 624,408
Int. Cl. H02m 1/18
U.S. Cl. 321—11                7 Claims

ABSTRACT OF THE DISCLOSURE

An anti-shorting circuit for an inverter including a series and a shunt controlled rectifier connectable to a reactive load. The circuit prevents application of a triggering pulse to one controlled rectifier at least until a reversal of current flow is detected relative to the other controlled rectifier.

---

This invention relates to an anti-shorting circuit for inverters of the type including series and shunt controlled rectifiers.

A common type of inverter circuit includes a series controlled rectifier which, when conductive, permits current flow from a DC source to the reactive load. A second controlled rectifier is connected in shunt with the load. The controlled rectifiers are alternately triggered into the conductive state to provide AC power to the load. This is accomplished by current flow through the load in one direction where the series controlled rectifier is conductive, and by permitting the reverse current flow created by the load reactance to pass through the shunt controlled rectifier. Preferably the controlled rectifiers are extinguished by means of parallel connected diodes which tend to pass the reverse current flow to build up a potential which reverse biases the associated controlled rectifier.

The difficulty often encountered with such inverters is that they may lose their commutation when subjected to abnormal loads and create a short-circuit across the DC source. In other words, a delay in the reverse current flow usually accompanies the abnormal load condition which means that the series controlled rectifier may not be extinguished when the shunt controlled rectifier is triggered into the conductive state. As a result, both controlled rectifiers are conductive and are connected in series directly across the DC source. In the pass trouble-free operation has been achieved over a relatively broad range by inserting a coupling filter between the inverter and the load. However, fast acting fuses were still required for protection outside the operating range.

Although fuse protection is adequate in many instances, there are other cases where fuse devices cannot be tolerated. In multi-phase installations, for example, an inordinate amount of time may be required in tracing the cause of the trouble. Also, short circuiting conditions, even though fuse protected, can in time damage the circuit elements.

These problems are eliminated in accordance with this invention by means of an anti-shorting circuit which prevents one controlled rectifier from becoming conductive until the other is extinguished. This is achieved by preventing application of the triggering pulse to a controlled rectifier at least until a reversal of current flow is detected in the other controlled rectifier.

Several illustrative embodiments are described in the following specification. The specification includes the drawings wherein:

FIG. 3 is a diagram as in FIG. 1 of an inverter with a circuit to prevent short circuiting according to the invention and containing an AND circuit with a magnetic core.

FIGURE 3a is a current-time graph of the output current $I_1$ of the inverter shown in FIG. 3;

FIG. 3b is a voltage-time graph of the triggering pulses supplied by the pulse generator 7 in FIG. 3;

FIG. 3c is a current-time graph of the current pulses supplied to the coil 25 of the magnetic core 22 in FIG. 3;

FIG. 3d is a graph showing the state of magnetization of the magnetic core 22 in FIG. 3;

FIG. 3e is a voltage-time graph of the pulses induced in the coil 24 of the core 22 in FIG. 3;

Figure 1:
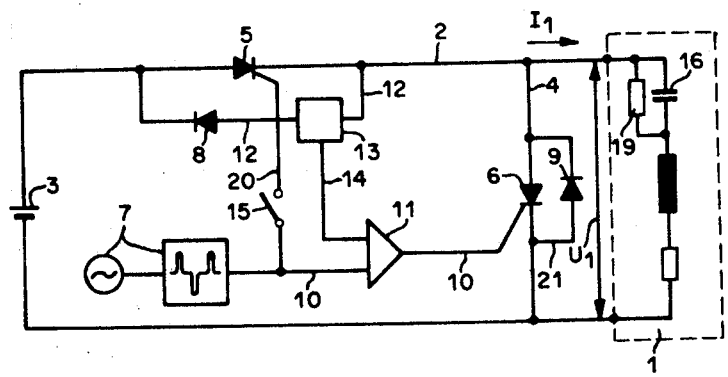
FIG. 1 is a theoretical diagram of a load-guided inverter with a circuit to prevent short circuiting according to the invention.

In the FIG. 1 diagram of a load guided inverter with an anti-shorting circuit according to the invention the load impedance 1 of the inverter, which appears as a series resonance circuit in the equivalent circuit diagram, is alternately connected to the source 3 of direct current by way of the series arm 2 and short circuited by the shunt arm 4. For this purpose a silicon controlled rectifier 6 in the shunt arm is alternately rendered conductive. This creates a square voltage at the load impedance 1, its fundamental frequency being equal to the frequency of the triggering pulses applied to the controlled rectifier 5 in the series arm. The controlled rectifiers 5 and 6 are triggered by pulses supplied by the generator 7, which acts as a source of timing pulses, and are automatically extinguished by reactive current flowing back from the load 1. This current flows through the diodes 8 or 9 connected anti-parallel with the controlled rectifiers 5 or 6, thereby generating the counter voltage at the controlled rectifier in question and forcing the latter to be extinguished. In a load guided inverter the prerequisite for the formation of the wattless current reflux is generally the presence of direct coupling filters between the output of the inverter and the actual load.

A further prerequisite for the construction of the load impedance and/or coupling filter arises from the fact that in order to prevent the current source 3 from being short circuited, one of the controlled rectifiers 5 or 6 must be already extinguished by the time the other is triggered. The wattless current reflux causing the controlled rectifier in one arm to be extinguished must therefore take place before the controlled rectifier in the other arm is triggered. As the sides of the square voltage generated by alternate conduction of the controlled rectifiers 5 and 6 at the output of the inverter and hence the stages where the fundamental wave of the square voltage passes through zero coincide in time with the triggering times of the controlled rectifiers, the change in direction of the output current, initiating the flowback of current, and/or the passage of the output current through zero must accordingly be located in time before the passage of the fundamental wave of the output voltage through zero. In other words, the output current must precede the output voltage. Since a current preceding the voltage can be obtained only in complex loads with a capacitative reactive component, the load resistor or the input impedance of the direct coupling filter must have a capacitative component at the fundamental frequency of the output voltage or, respectively, at the timing frequency of the ignition of the controlled rectifier in the series arm. In load guided inverters this requirement is usually met by making the elements of the coupling filter a suitable size.

However, since the damping of the filter must not be too great the fundamental frequency of the output voltage, the load coupled to the output of the filter appears at the input of the filter to a not inconsiderable extent. In the case of abnormal loads there may, therefore, be an input resistance with an inductive reactive component. In such cases the output current of the inverter would follow the output voltage, i.e. the reactive current reflux causing the controlled rectifier 5 in the series arm to be extinguished would not start till after controlled rectifier 6 in the shunt arm had been triggered and the triggering of the controlled rectifier 6 would accordingly be accompanied by short circuiting of the direct current source 3 via the controlled rectifiers 5 and 6. In order to prevent such short circuiting the AND circuit 11 is included in the triggering line 10 of the controlled rectifier 6; this circuit does not provide an output pulse until the controlled rectifier 5 is extinguished so that whenever the reactive current reflux on the load 1 or the filter does not start until after the triggering time of the controlled rectifier 6 in the shunt arm, i.e. whenever the load 1 or the input resistance of the coupling filter has an inductive reactive component, AND circuit 11 will block the supply of triggering pulses to the controlled rectifier 6 and thus prevent it from being triggered.

A criterion of the cutting through of the AND circuit 11 is the actual reactive current reflux causing the controlled rectifier 5 to be extinguished. As this reflux is passed through the diode 8, AND circuit 11 is conditioned by a control signal derived directly from an impedance included in the line 12 of the diode 8. The impedance in line 12 can be an ohmic resistor or a current transformer which is represented by the block 13 connected in the line 12. In the simplest instance it contains a current transformer with its primary side connected to the diode line 12 and its secondary side coupled by way of the line 14 to the free input of the AND circuit 11.

Normally, i.e. with a load having a capacitative reactive component, the FIG. 1 circuit works as follows:

When power is first transmitted from the source 3 of direct current via the inverter to the load impedance 1, the switch 15 in the triggering line of the controlled rectifier 5 is closed. At the first triggering impulse the controlled rectifier 5 is ignited. Current then flows in a positive direction into the load impedance 1 which in the equivalent circuit diagram is shown as a damped series resonance circuit. The current $I_1$ flowing into the load impedance 1 at first charges the capacitor 16, to a voltage which, on account of the overshooting of the series resonance circuit forming the load, is higher than that of the DC voltage source 3. When the maximum voltage is reached in the capacitor 16 the direction of the current is reversed. The current $I_1$ now flows back in the opposite direction through the diode line 12 and reflux diode 8 to the DC voltage source 3. The appearance of the reflux current creates a negative voltage at the controlled rectifier 5 so that the latter is extinguished. The current flowing back through the line 12 flows through the block 13 containing, for example, a current transformer, and it generates a conditioning signal which is passed on through the line 14 to the AND circuit 11. With the arrival of this signal the AND circuit 11 is conditioned or released ready to pass a triggering pulse so that the triggering impulse thereafter supplied by the generator 7 for the controlled rectifier 6 in the shunt arm can pass through it. With the arrival of the triggering impulse at the controlled rectifier 6 the latter is ignited and the reflux current which until then had flowed through the diode 8 by way of the DC source 3 is now supplied to it in a blocking direction. The reflux current continues to flow through the controlled rectifier 6 until the voltage at the capacitor 16 passes through a minimum so that the current is again reversed. The current $I_1$ next flows through the reflux diode 9, and the controlled rectifier 6 is simultaneously extinguished. Shortly afterwards the controlled rectifier 5 in the series arm 2 is again triggered and the whole process is repeated.

In the intervals between signals or between power transmission from the DC source 3 to the load 1 the triggering of the controlled rectifier 5 in the series arm is interrupted. This is done by means of the above mentioned switch 15 which is shown symbolically as a mechanical switch FIG. 1 but may obviously be an electronic one.

Figure 2:
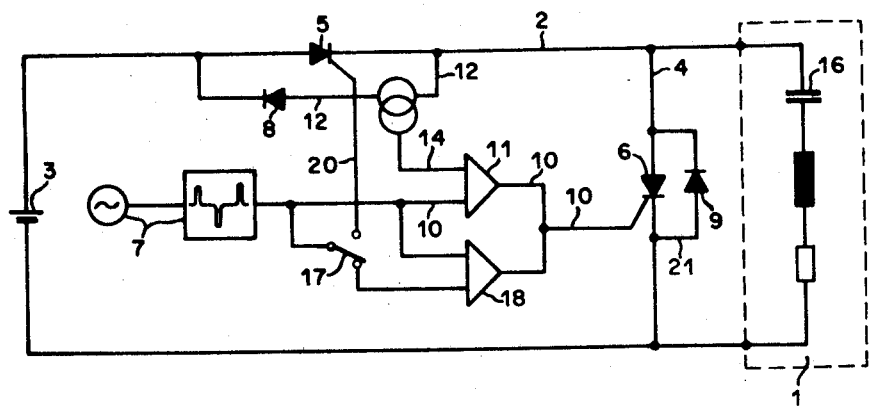
FIG. 2 shows the same, the circuit being provided with additional means for triggering the controlled rectifier in the shunt arm even during the intervals when the inverter is not in operation.

As shown in FIG. 2, this switch is desirably a two position switch 17 in which the movable contact arm is connected to the triggering impulse generator 7 and one stationary contact to the control electrode of the controlled rectifier 5 in the series arm, while the contact arm and the other stationary contact of the switch are connected to the two inputs of an additional AND circuit 18, the output of which is connected to the control electrode of the controlled rectifier 6 in the shunt arm 4. In this way the controlled rectifier 6 in the shunt arm is triggered even in intervals while the inverter is not operating, thereby ensuring that the capacitor 16 is satisfactorily discharged during such intervals. Discharge is desirable in order to obtain defined starting conditions for the process of building up the load impedance 1 or the coupling filter, which takes place when signals start to be emitted or when power starts to be transmitted from the DC source 3 to the load. Even during the building up process the passages of the output current $I_1$ of the inverter through zero must precede the associated changing times of the output voltage $U_1$ by a running time always longer than the extinguishing time of the controlled rectifiers 5 and 6. In other words, so as to provide starting conditions for the building up processes of the load under which short circuiting of the DC voltage source 3 by the controlled rectifiers 5 and 6 is completely impossible even during the building up process. If an additional AND circuit 18 as shown in FIG. 2 is not used, it is advisabe to connect a discharging resistor 19 in parallel with the capacitor 16 to discharge in the intervals between signals as shown in FIG. 1.

In addition to the means contained in the circuits in FIGS. 1 and 2 for blocking the triggering of the controlled rectifier 6 in the shunt arm until the appearance of the control value indicating that the controlled rectifier 5 in the series arm has been extinguished, means (not shown in FIGS. 1 and 2) may of course also be provided to block the triggering of the controlled rectifier 5 in the series arm so long as the controlled rectifier 6 in the shunt arm is ignited. Like the means shown in FIG. 2 for blocking the triggering of the controlled rectifier in the shunt arm, these means may comprise an AND circuit and a current transformer, the AND circuit being connected in the triggering line 20 of the controlled rectifier 5, the primary side of the current transformer in the line 21 of the diode 9, the secondary side thereof connected to the free input of the AND circuit. But such additional means for blocking triggering of the controlled rectifier in the series arm is generally required only when the conditions for connecting the inverter are unusual, e.g. when it is connected to a network suffering from frequent serious disturbances.

FIG. 3 illustrates the circuit for an inverter provided with an anti-short circuiting connection according to the invention and built up as in the FIG. 1 diagram. In this case the AND circuit 11 is formed by a magnetic core 22 with an input coil 23, output coil 24 and control coil 25, while the block 13 (FIG. 1) here comprises the ohmic resistance 26 connected into the diode line 12 and a monostable multivibrator 27.

The operation of the FIG. 3 circuit corresponds to that of the inverter in FIG. 1, so will be further explained only in connection with the special properties of the FIG. 3 circuit.

As in FIG. 1, the criterion for the extinguishing of the controlled rectifier 5 in the series arm is the energisation of the reflux diode 8.

FIG. 3a shows the timing of the input current $I_1$ in the FIG. 3 circuit in a normal case, i.e. where the load impedance 1 has a capacitative reactive component at the frequency of the ignition of the controlled rectifier 5 in the series arm.

A voltage impulse 28 generated by the reflux current at the resistor 26 causes the monostable multivibrator 27 to respond and this in turn sends a short current impulse (FIG. 3c) through the control coil 25 of the ferrite core 22. The magnetisation of the core 22 is consequently reversed (FIG. 3d), so that the impulse emitted somewhat later by the generator 7 to the input coil 23 of the core 22 can restore the latter to its original magnetic state. The restoration of the core induces in the output coil 24 thereof an impulse 29 of such polarity (FIG. 3e) as to trigger the controlled rectifier 6 in the shunt arm, the control electrode of which is connected to the coil 24. If there is no voltage impulse at the resistor 26 and therefore no control impulse of the multivibrator 27, the magnetisation of the core 22 will not be reversed and the core will remain in its original state. In this case it cannot be restored, so no impulse can be induced in the output coil 24 to trigger the controlled rectifier 6, and the shunt arm 4 will remain blocked.

The advantage of this circuit is that the shunt arm can be triggered even if the reflux current in the series arm drops to zero before the triggering time for the shunt arm.

Figure 4:
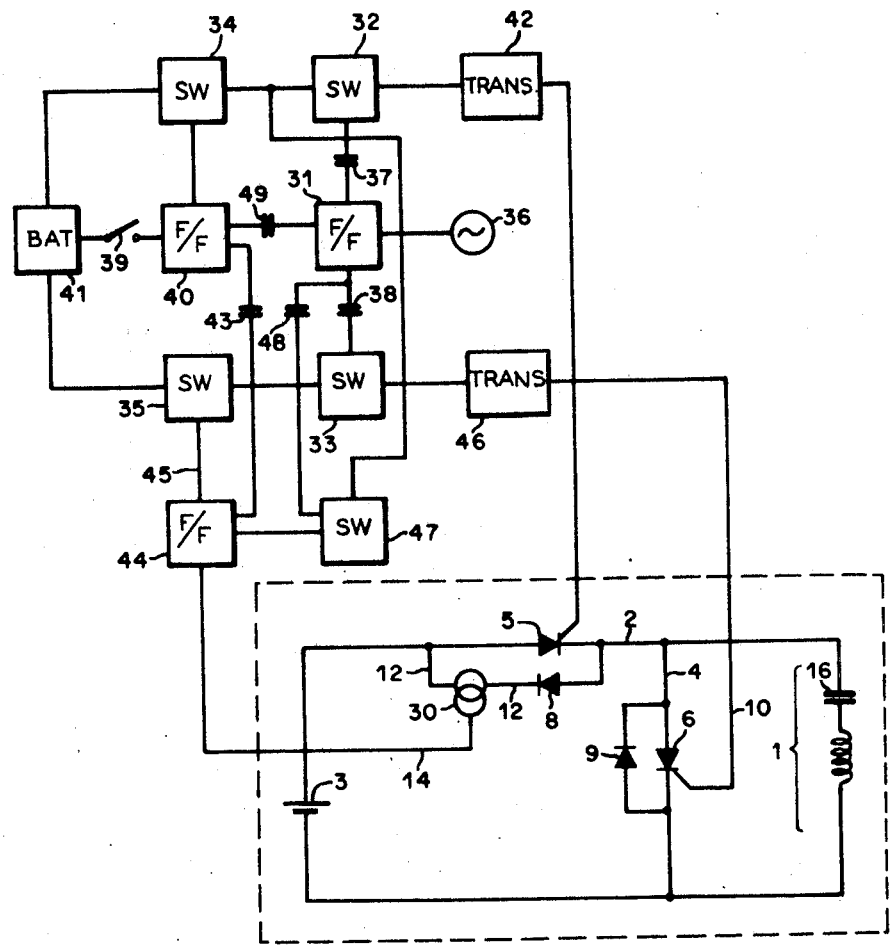
FIG. 4 is a block-type diagram of a load guided inverter with a control unit containing the anti-shorting circuit according to the invention.

FIG. 4 shows the connection for an inverter built up as in the FIG. 2 diagram and with a block-type diagram of a control unit containing an anti-short circuiting connection according to the invention.

The criterion for the extinguishing of the controlled rectifier 5 in the series arm is again, as in the FIG. 1 circuit, the appearance of current in the reflux diode 8. So that the conditions for rendering controlled rectifier 6 conductive can be achieved, the primary side of the current transformer 30 is connected in the diode line 12, the secondary side being connected to the control unit via the control line 14.

The triggering impulse generator comprises a bistable multivibrator 31, two impulse switches 32 and 33 controlled thereby, two electronic switches 34 and 35 and an audio frequency generator 36. The bistable multivibrator 31 is controlled by the audio frequency generator 36 with a sinusoidal AC voltage and in time with this voltage alternately connects for a short time the impulse switches 32 and 33, coupled to the differentiating capacitors 37 and 38, the switch 32 being coupled at each positive half wave of the AC voltage supplied by the generator 36 and the switch 33 at each negative half wave.

The ignition is switched on by means of the switch 39, which when closed brings the bistable multivibrator 40 into its set state and thereby turns on the electronic switch 34. When the switch 34 is in this staate, a triggering impulse will be sent from the battery 41 via the transducer 42 to the control electrode of the controlled rectifier 5 each time the impulse switch 32 is turned on. The form of the pulse is determined by the operation of switch 32.

When the multivibrator 40 is switched over into the set state it sends a control impulse through the differentiating capacitor 43 to the bistable multivibrator 44, to bring the latter into a reset state. Each time the controlled rectifier 5 is extinguished the multivibrator 44 receives, from the current transformer 30, a control signal generated by the reflux current which brings the multivibrator 44 into the set state. Once switched over into this state the multivibrator 44 turns on the electronic switch 35 along the line 45 so that when the impulse switch 33 is momentarily turned on current flows from the battery 41 via the transducer 46 to the control electrode of the controlled rectifier 6 in the shunt arm to thereby render controlled rectifier 6 conductive. The form of the triggering pulse is determined by the impulse switch 33.

Simultaneously with the turning on of the switch 33, the bistable multivibrator 31 sends the electronic switch 47 an impulse via the differentiating capacitor 48 which momentarily turns on the switch 47. If the switch 34 is also on at the time of this momentary through connection of the switch 34, the battery 41 will send a signal impulse by way of switches 34 and 47 to the bistable multivibrator 44 to bring the latter back into its reset state, so that the electronic switch 35, which is turned on only when the multivibrator 44 is in its set state, will reopen immediately after the turning on of the switch 33. In this way the triggering of the controlled rectifier 6 in the shunt arm is again blocked until the multivibrator 44 is brought back into its set state by a signal produced by reflux current in the diode line 12.

In intervals between the transmission of power from the DC source 3 to the load impedance 1 and/or intervals between signals, the switch 39 is opened to prevent the controlled rectifier 5 in the series arm from being triggered. This brings the bistable multivibrator 40 into the reset state and opens the electronic switch 34, which is turned on only when the multivibrator is in its set state. The opening of the switch 34 blocks the triggering of the controlled rectifier 5 in the series arm. The reflux current of the impulse sent to the load by the last triggering of the controlled rectifier 5 before the switch 34 was turned off brings the multivibrator 4 into its set state via the current transformer 30 and control line 14 and thus turns on the electronic switch 35. The multivibrator 44 is prevented from returning to its reset state on the subsequent triggering of the controlled rectifier 6 in the shunt arm by the fact that the switch 34 is turned off so that no returning signal can be conveyed to the multivibrator 44 by way of the switches 34 and 47. So long as the switch 39 is turned off the multivibrator 44 therefore remains in its set state and accordingly keeps the electronic switch 35 turned on. The controlled rectifier 6 in the shunt arm is therefore triggered in the intervals between signals and/or when the switch 39 is turned off, thereby providing for the discharge of the capacitor 16 in the intervals between signals. As already mentioned in connection with FIG. 2, such discharge is desirable in order to obtain defined starting conditions for the building up process of the filter at the emission of the next signal. The continuous ignition of the controlled rectifier 6 in the shunt arm further prevents any long duration extinguishing of the oscillations of the filter once the switch 39 has been turned off.

Figure 5:
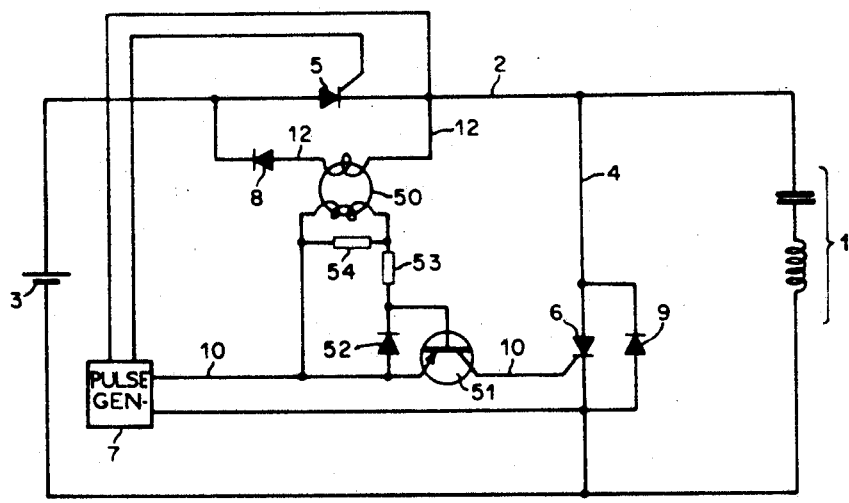
FIG. 5 is a diagram as in FIG. 1 of an inverter with an anti-shorting circuit according to the invention, containing an AND circuit with a transistor switch.

FIG. 5 shows the circuit for a further inverter provided with an anti short circuiting connection according to the invention and built up as in the diagram in FIG. 1. The AND circuit 11 in FIG. 1 is here formed by a transistor switch and the block 13 in FIG. 1 here contains only the current transformer 50 with its primary side connected in the diode line 12.

In the anti short circuiting connection here used the triggering impulse for the shunt arm is released by the transistor switch comprising elements 51, 52, 53 and 54. The emitter-collector circuit of the transistor 51 is connected into the triggering line 10 of the controlled rectifier 6 in the shunt arm. The transistor 51 is normally blocked and is transferred to a conductive state only by a signal generated by the reflux current flowing through the reflux diode 8 and transmitted to the input of the transistor switch by the current transformer 50. During the times when a reflux current is flowing through the diode 8, and the controlled rectifier 5 is accordingly extinguished, the triggering impulse generator 7 is connected to the control electrode of the controlled rectifier 6 in the shunt arm so that the controlled rectifier 6 can then be ignited. The limit diode 52 and pre-resistor 53 protect the base-emitter circuit of the transistor 1 from overloading.

Figure 6:
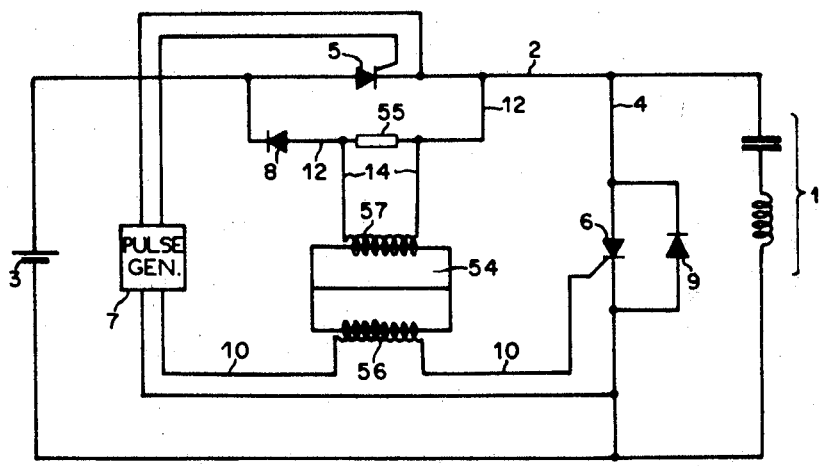
FIG. 6 is a diagram as in FIG. 1 of an inverter with an anti-shorting circuit according to the invention, containing a transducer or transductor as the AND circuit.

A further circuit for an inverter provided with an anti short circuiting connection according to the invention and built up as in FIG. 1 is illustrated in FIG. 6. In this circuit the AND circuit 11 (FIG. 1) is formed by the transducer 54 and the block 13 (FIG. 1) here contains only the ohmic resistor 55.

The supply of triggering impulses for the shunt arm is here released by means of the transducer 54. The controllable inductivity of the coil 56 of the transducer lies in the triggering line 10 of the controlled rectifier 6. So long as the control coil 57 of the transducer 54 is de-energised the inductivity of the coil 56 will form such a high impedance for the triggering impulses that the latter cannot be transmitted from the generator 7 to the control portion of the controlled rectifier 6. Triggering of the controlled rectifier 6 is thus blocked so long as the coil 57 is de-energised. With the appearance of the reflux current in the series arm 2 and the consequent extinguishing of the controlled rectifier 5 the core of the transducer 54 is driven into a state of magnetic saturation by the reflux current, part of which flows through the coil 57. The transducer is suitably constructed to prevent this change of direction in the coil 56 from inducing a voltage and thereby inadvertently triggering the controlled rectifier 6. The accidental generation of impulses when changing the direction of the transducer 54 may, for example, be prevented by using core plates of special section as indicated e.g. in FIG. 6 or by means of a compensating circuit using two separate transducers. When saturation is reached the impedance of the coil 56 of the transducer 54 is so slight that triggering impulses can be transmitted from the generator 7 to the control portion of the controlled rectifier 6. With the ignition of the controlled rectifier 6 and consequent blocking of the diode 8 and/or with the end of the reflux current through the diode 8, the coil 57 is de-energised and the transmission of triggering impulses from the generator 7 to the controlled rectifier 6 again blocked.

In this circuit it is an advantage to be able to dispense with the use of semiconductors for the anti short circuiting connection, thus providing maximum assurance of the constant readiness of the said circuit.

While several illustrative embodiments have been described in detail, it should be obvious that these embodiments do not exhaust the possible combinations and variations within the scope of this invention.

We claim:

1. An anti-shorting circuit for an inverter connectable to a reactive load comprising
    a DC source;
    a series controlled rectifier connected so as to supply current from said source to the load;
    a shunt controlled rectified connected across the load;
    a trigger pulse generator connected to the control elements of said controlled rectifiers to apply trigger pulses which alternately render said controlled rectifiers conductive;
    a diode connected in parallel with each of said controlled rectifiers to pass reverse current flow to thereby extinguish the associated controlled rectifier; and
    an impedance in series with said diode coupled to one of said controlled rectifiers and responsive to the reverse current flow therethrough, said impedance being connected between said trigger pulse generator and the other of said controlled rectifiers to prevent the application of trigger pulses thereto at least until after the appearance of said reverse current flow through said one controlled rectifier.

2. The circuit according to claim 1 wherein said impedance is a current transformer.

3. The circuit according to claim 1 wherein said impedance is ohmic.

4. An anti-shorting circuit for an inverter connectable to a reactive load comprising
    a DC source;
    a series controlled rectifier connected so as to supply current from said source to the load;
    a shunt controlled rectifier connected across the load;
    a trigger pulse generator connected to the control element of said controlled rectifier to apply trigger pulses which alternately render said controlled rectifiers conductive;
    a diode connected in parallel with each of said controlled rectifiers to pass reverse current flow to thereby extinguish the associated control rectifier; and
    an AND circuit means, said AND circuit means comprising a bistable multivibrator, operatively connected to be placed in a conditioned state in response to a reverse current flow through said diode in parallel with one of said controlled rectifiers, and when in said conditioned state being operative to pass a trigger pulse from said pulse generator to the other of said controlled rectifiers.

5. An anti-shorting circuit according to claim 4 wherein said AND circuit means comprises a transistor switch, the collector-emitter junction of said transistor providing the means for transmitting the trigger pulse.

6. An anti-shorting circuit according to claim 4 wherein said AND circuit comprises a transistor switch.

7. An anti-shorting circuit according to claim 4 wherein said AND circuit means comprises a magnetic transducer, said transducer having the property that the inductivity of one coil is directly controlled by the amount of current flowing in a second coil of said transducer.

References Cited

UNITED STATES PATENTS

| | | | |
|---|---|---|---|
| 3,120,633 | 2/1964 | Genuit | 321—45 |
| 3,129,374 | 4/1964 | Relation et al. | 321—45 X |
| 3,332,001 | 7/1967 | Schwarz | 321—11 |

LEE T. HIX, Primary Examiner

W. H. BEHA, JR., Assistant Examiner

U.S. Cl. X.R.

321—12, 45

UNITED STATES PATENT OFFICE
CERTIFICATE OF CORRECTION

Patent No. 3,502,957                                        March 24, 1970

Richard Fried et al.

It is certified that error appears in the above identified patent and that said Letters Patent are hereby corrected as shown below:

In the heading to the printed specification, lines 4 to 6, "Richard Fried, Fadenstrasse 35, Zug, Switzerland, and Rudolf Arthur Ausfeld, Santisstrasse 3, Pfaffenhausen, Zurich, Switzerland" should read -- Richard Fried, Zug, Switzerland, and Rudolf Arthur Ausfeld, Zurich, Switzerland, assignors to Landis & Gyr, A.G., Zug, Switzerland, a body corporate of Switzerland --.

Signed and sealed this 23rd day of March 1971.

(SEAL)
Attest:

EDWARD M. FLETCHER, JR.                            WILLIAM E. SCHUYLER, JR.
Attesting Officer                                        Commissioner of Patents